United States Patent
Bates et al.

(10) Patent No.: US 7,920,572 B2
(45) Date of Patent: Apr. 5, 2011

(54) MODIFYING OPERATION OF PEER-TO-PEER NETWORKS BASED ON INTEGRATING NETWORK ROUTING INFORMATION

(75) Inventors: Anthony Bates, Los Altos, CA (US); Anthony Li, Los Altos, CA (US); Jan Medved, Pleasanton, CA (US); Amy Zhang, San Mateo, CA (US); George Suwala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 693 days.

(21) Appl. No.: 11/231,432

(22) Filed: Sep. 20, 2005

(65) Prior Publication Data

US 2007/0064702 A1    Mar. 22, 2007

(51) Int. Cl.
*H04L 12/56*    (2006.01)
*H04L 12/28*    (2006.01)
*G06F 15/173*    (2006.01)

(52) U.S. Cl. ............ 370/395.2; 370/392; 370/395.31; 370/395.5; 370/401; 709/240; 709/241; 709/242; 709/243

(58) Field of Classification Search ............ None
See application file for complete search history.

(56) References Cited

U.S. PATENT DOCUMENTS

| | | | |
|---|---|---|---|
| 6,339,595 B1 * | 1/2002 | Rekhter et al. ............ 370/392 |
| 7,379,428 B2 * | 5/2008 | Xu et al. .................. 370/254 |
| 7,379,967 B2 * | 5/2008 | Izutsu et al. ............. 709/204 |
| 7,398,301 B2 * | 7/2008 | Hennessey et al. ........ 709/217 |
| 2002/0143944 A1 * | 10/2002 | Traversat et al. .......... 709/225 |
| 2002/0156917 A1 * | 10/2002 | Nye ........................ 709/238 |
| 2003/0174653 A1 * | 9/2003 | Basu et al. ................. 370/238 |
| 2003/0208621 A1 * | 11/2003 | Bowman .................... 709/242 |
| 2003/0225796 A1 * | 12/2003 | Matsubara ................. 707/200 |
| 2004/0177157 A1 * | 9/2004 | Mistry et al. .............. 709/241 |
| 2005/0015466 A1 * | 1/2005 | Tripp ....................... 709/219 |
| 2005/0047353 A1 * | 3/2005 | Hares ....................... 370/255 |
| 2006/0140136 A1 * | 6/2006 | Filsfils et al. .............. 370/255 |
| 2006/0218222 A1 * | 9/2006 | Brahmbhatt et al. ....... 709/201 |
| 2006/0291446 A1 * | 12/2006 | Caldwell et al. ........... 370/351 |
| 2007/0028133 A1 * | 2/2007 | Izutsu et al. ............... 714/4 |

OTHER PUBLICATIONS

Cohen, Bram. "Incentives Build Robustness in BitTorrent," BitTorrent, May 2003.*

* cited by examiner

*Primary Examiner* — Daniel J Ryman
*Assistant Examiner* — Thinh D Tran
(74) *Attorney, Agent, or Firm* — Hickman Palermo Truong & Becker LLP

(57) ABSTRACT

A data processing method comprising establishing a first node in a peer-to-peer data communications network, wherein the node is configured as a supernode in conformance with a peer-to-peer communications protocol, wherein the first node is configured as an active listener to one or more network routing protocols executing at a network router; receiving a routing information message from one of the network routing protocols; modifying an operational characteristic of the first node in response to the routing information message; receiving a request from a second node in the peer-to-peer network for a resource that is known to the first node; and responding to the request based on the modified operational characteristic. For example, a peer-to-peer node may be configured as a network-aware BitTorrent Tracker, Gnutella supernode, etc., and can use IGP and BGP information from a router to determine how the node behaves.

28 Claims, 5 Drawing Sheets

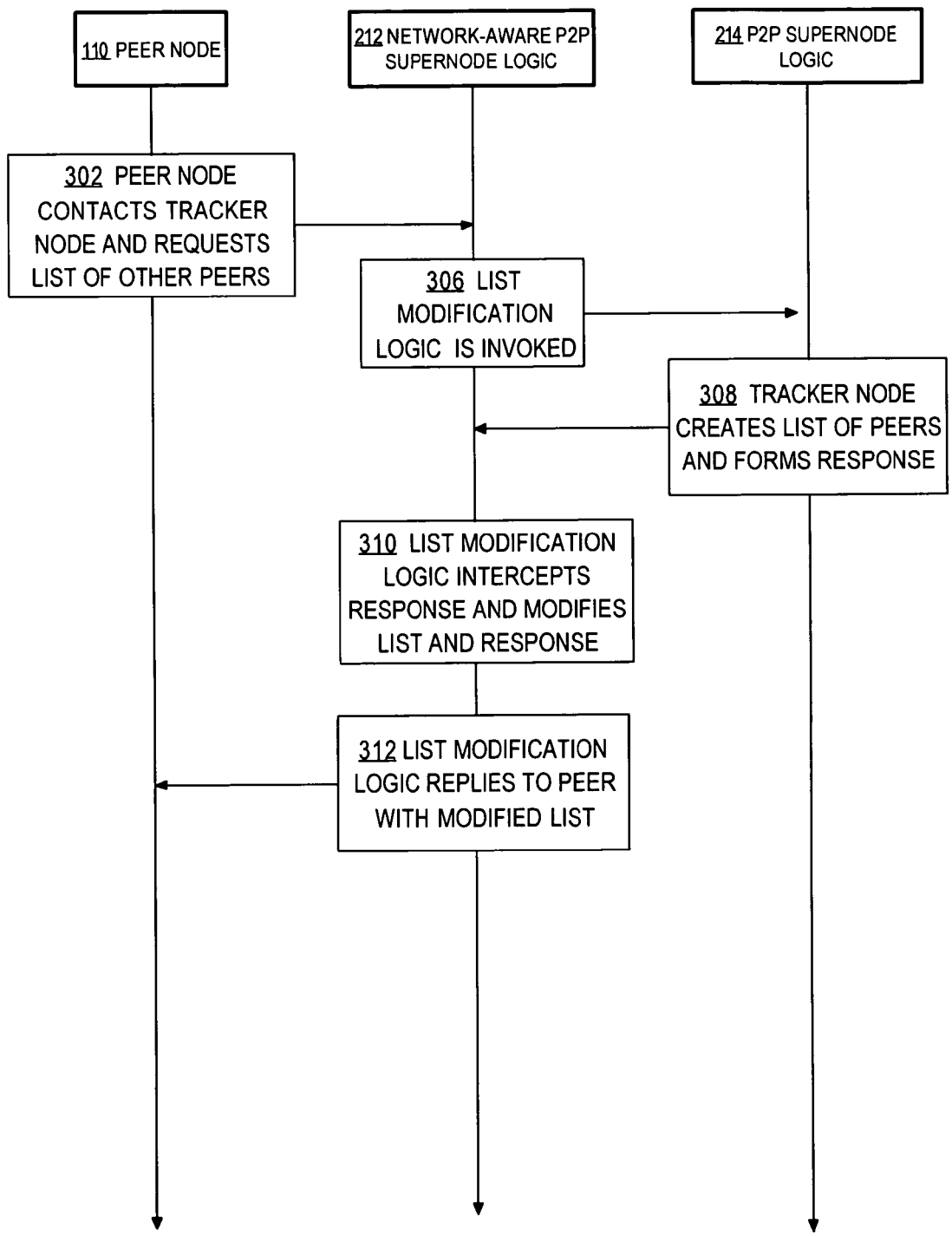

MODIFYING OPERATION OF PEER-TO-PEER NETWORKS BASED ON INTEGRATING NETWORK ROUTING INFORMATION

FIELD OF THE INVENTION

The present invention generally relates to networked data processing. The invention relates more specifically to approaches for managing and improving the operation of peer-to-peer networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The number and size of peer-to-peer data communications networks operating in connection with the public internetworks known as the Internet have grown rapidly in recent years. At the time of this writing, some studies estimate that at least half of all Internet bandwidth consumption is peer-to-peer traffic. Examples of peer-to-peer networks include those using Fast Track, eDonkey, Gnutella, BitTorrent, and research networks such as Chord and Tapestry.

The explosive growth of peer-to-peer traffic presents problems for Internet Service Provider (ISP) enterprises, because Internet routing infrastructure elements and related computing elements have not been designed to accommodate the massive amounts of data that are being exchanged among peer-to-peer hosts. In various implementations, peer-to-peer hosts hold resources for delivery on request to other hosts, or execute applications that can service requests from other hosts.

A typical peer-to-peer network is implemented using software nodes that conceptually are overlaid on top of a network of hardware nodes, such as routers and switches, which use Internet Protocol and related protocols for inter-node network communication. In this arrangement, the peer-to-peer nodes do not receive information about network topology and traffic dynamics.

In certain deployments, the routers and switches may use deep packet inspection or Application-Oriented Network System (AONS) approaches to learn that the routers or switches are carrying peer-to-peer traffic. However, these approaches are not widely deployed, and cannot affect how the peer-to-peer nodes select resource locations, select resource replicas, send traffic to other peer nodes, or perform other tasks.

Because peer-to-peer nodes and applications presently ignore underlying network topology and data processing characteristics, peer-to-peer users may not receive the best possible experience. For example, peer-to-peer content might be served from hosts that do not have optimal network reachability, or network-attached resources might not be used optimally.

The expanding use of peer-to-peer networks also imposes significant new costs on ISPs as a result of certain characteristics of peer-to-peer protocols. For example, when a peer that uses the BitTorrent protocol requests content, standard BitTorrent tracker nodes return a list of randomly selected peer nodes that have the requested content. The optimal performance of BitTorrent derives, in part, from the randomness of peer selection. The requesting peer node can connect to any other peer node on the list to obtain the requested content. However, if the requesting peer node is located within a first ISP network and the other peer node is in a second ISP network, the first ISP may charge the second ISP for carrying traffic that terminates in the second ISP network. There is presently no way to constrain the behavior of peer-to-peer protocols to nodes within one ISP or autonomous system. There is a need to provide such a constraint while maintaining optimal performance of peer-to-peer protocols.

Akamai, Inc. has deployed a content delivery network comprising distributed content servers. In the Akamai architecture the content servers are decoupled from the Internet in the sense that content servers do not receive routing protocol information from routers or servers that are connected to the content servers. Akamai technology does not select content servers based on routing protocol information.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram of a method of operating a network-aware supernode;

DETAILED DESCRIPTION

Figure 1:
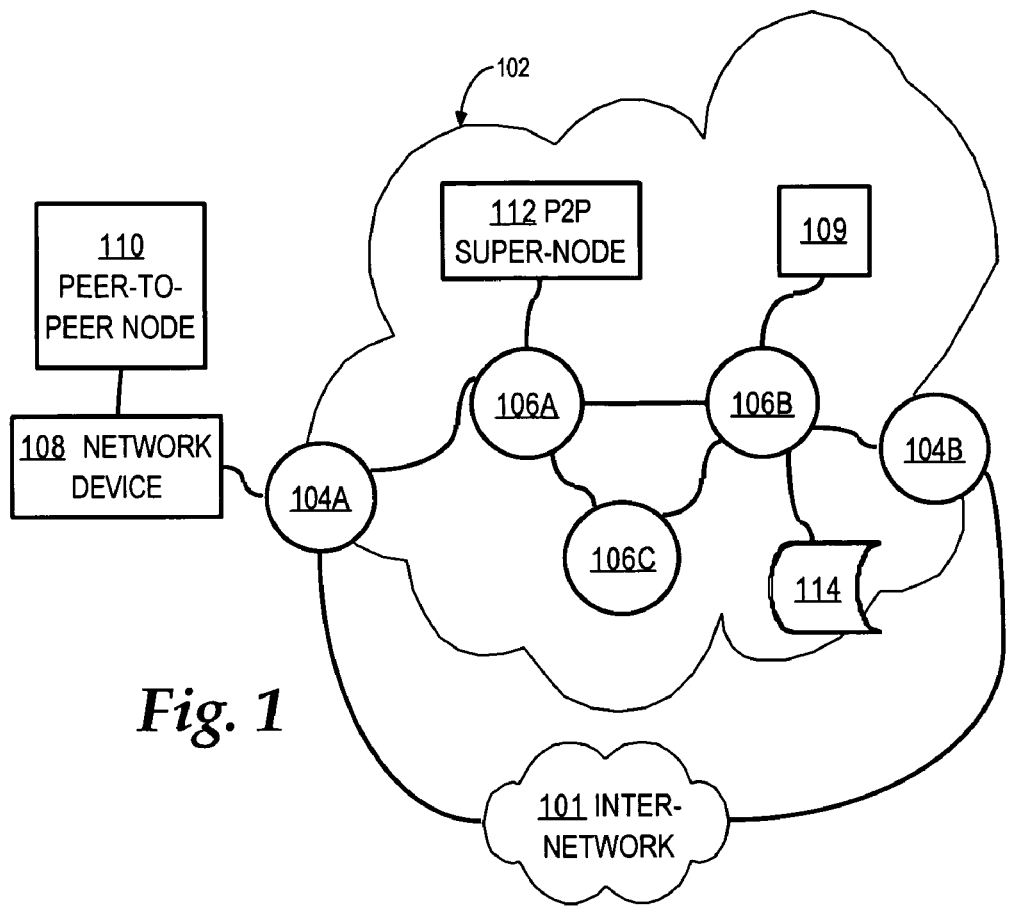
FIG. 1 is a block diagram of a network arrangement that may be used to implement an embodiment.

A method and apparatus for modifying operation of peer-to-peer networks based on integrating network routing information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Modifying Operation Of Peer-To-Peer Networks Based On Integrating Network Routing Information
   2.1 Network-Aware Peer-to-Peer Supernode
   2.2 Modifying Operation Based on Network Routing Information
      2.2.1 Using IGP Information
      2.2.2 Using BGP Information
   2.3 Example Network-Aware Node Configurations
      2.3.1 Network-Aware BitTorrent Tracker
      2.3.2 Network-Aware Gnutella Ultrapeer 2.4 Other Operational Modifications
2.5 Distributed Service Providers and Applications
3.0 Implementation Mechanisms-Hardware Overview
4.0 Extensions and Alternatives 1.0 General Overview The needs identified in the foregoing Background, and other needs and objects that will become apparent for the following description, are achieved in the present invention, which comprises, in one aspect, a data processing method, comprising establishing a first node in a peer-to-peer data communications network, wherein the node is configured as a supernode in conformance with a peer-to-peer communications protocol, wherein the first node is configured as an active listener to one or more network routing protocols executing at a network router; receiving a routing information message from one of the network routing protocols; modifying an operational characteristic of the first node in response to the routing information message; receiving a request from a second node in the peer-to-peer network for a resource that is known to the first node; and responding to the request based on the modified operational characteristic.

In one feature of this aspect, the peer-to-peer communications protocol is BitTorrent. In another feature, the peer-to-peer communications protocol is any one selected from the group consisting of Kazaa, Gnutella, Fast Track, eDonkey, Chord, and Tapestry. In other features, any other peer-to-peer protocol may be used.

In yet another feature, the one or more network routing protocols comprise BGP. In a related feature, the routing information message comprises a BGP UPDATE message, and wherein the operational characteristic comprises referring the second node to a replica of the resource that is located only within a BGP autonomous system that includes the router.

In another feature, the one or more network routing protocols comprise a link-state IGP with Traffic Engineering extensions. As examples, the IGP may be OSPF or IS-IS. In a related feature, the routing information message comprises an IGP link status update message, and wherein the operational characteristic comprises referring the second node to a replica of the resource that is located only on a link that is referenced in the link status update message and that is preferred with respect to the router based on the link state. In another related feature, the IGP link state update message specifies any parameter selected from the group consisting of link cost, link delay, and link utilization. Further, the operational characteristic may comprise routing traffic from the first node to the second node on a path that is determined at least in part based on the link status update message.

In another aspect, a supernode of a peer-to-peer data communication protocol is coupled to routing protocol information available at routers, switches, or other network elements. As a result, routers provide direct information about network topology, available bandwidth, and trade-offs between various network parameters including bandwidth, delay, link quality, etc. Based on the information from a router, a supernode can modify an operating characteristic. For example, the supernode can use the routing protocol information to select between various end service hosts in a context of different connection paths that are available to reach them. Further, routers can vary their behavior, such as application of quality-of-service policy, relating to peer-to-peer traffic.

In other aspects, the invention encompasses a peer-to-peer network, computer apparatus and a computer-readable medium configured to carry out the foregoing steps.

2.0 Modifying Operation of Peer-to-Peer Networks Based on Integrating Network Routing Information 2.1 Network-Aware Peer-to-Peer Supernode According to one embodiment, a data processing method provides an approach for coupling peer-to-peer applications and routers or switches that implement the underlying transport network. In one embodiment, the approaches herein are implemented using a supernode that conforms to a peer-to-peer communication protocol and that includes software instructions for implementing the functions described herein. In this context, a supernode is a node in a network that provides peer-to-peer applications with information about service, such as availability and location of non-real-time content, e.g., music, video, etc. A supernode also may provide peer-to-peer applications with information about the availability or location of real-time interaction points, such as persons available for voice, video, or game interaction. A supernode also may provide peer-to-peer applications with information about available resources such as CPUs, storage, etc.

The term supernode is used broadly herein to encompass network nodes that may implement the approaches herein, as well as either (1) the functions and features of distributed nodes that are termed "supernodes" under the Kazaa or Skype protocols or termed an "ultrapeer" in a Gnutella network, and (2) centralized nodes that are termed "tracker" nodes under the BitTorrent protocol.

FIG. 1 is a block diagram of a network arrangement that may be used to implement an embodiment. A packet-switched network 102 comprises edge routers 104A, 104B and core routers 106A, 106B, 106C. The edge routers 104A, 104B and core routers 106A, 106B, 106C may comprise any network element suitable for maintaining routing control plane information and forwarding packets based on the control plane information. Commercial examples include Cisco 12000 Series Routers. Links among routers may use Ethernet, Fast Ethernet, Gigabit Ethernet, optical links, etc.

Edge routers 104A, 104B may be coupled to one or more internetworks 101. For example, internetwork 101 represents the collection of public packet-switched internetworks popularly termed "the Internet." Links among edge routers an internetwork 101 may use DSL, cable, Ethernet, etc. Internetwork 101 may hold additional content servers and peer-to-peer nodes or supernodes. In this document, "coupled" means connected directly or indirectly through one or more intermediate nodes.

A network device 108 that hosts a peer-to-peer node 110 is coupled to edge router 104A. In various embodiments, any number of other routers or switches may connect between device 108 and edge router 104A. Network device 108 may comprise any combination of data processing hardware and software that can host a peer-to-peer network node application or system. Examples of devices suitable for use as network device include cellular radiotelephones, personal computers, personal digital assistants, set-top boxes, etc. The approaches herein may be used with any form of peer-to-peer node now known or developed in the future.

A second peer-to-peer node 109 is coupled to router 106B. Nodes 109, 110 can establish peer-to-peer communications using any of a plurality of peer-to-peer communication protocols, such as BitTorrent, Gnutella, etc., and exchange data. A content server 114 is coupled to router 106B. Content server 114 holds applications, services, data files, audio, video, multimedia, or other information that nodes 109, 110 may wish to use or retrieve. In some embodiments, content server 114 is a peer-to-peer node that can store and exchange content with device 118. Further, each of the nodes 109, 110 may hold applications, services or files that another node may wish to use or retrieve.

A peer-to-peer supernode 112 is coupled to router 106A. Supernode 112 performs management functions for a set of peers in a peer-to-peer network. Collectively, nodes 109, 110, 112, 114 form a peer-to-peer network that is conceptually overlaid on the network of routers 104A, 104B, 106A, 106B, 106C.

Network 102 may comprise an autonomous system (AS) for purposes of Border Gateway Protocol (BGP) and other inter-domain routing protocols. For example, network 102 may be owned and operated by an Internet Service Provider (ISP). Internetwork 101 may include any number of other autonomous systems associated with other ISPs that compete with the ISP that owns network 102. ISPs often must pay fees to one another for carrying traffic to a competitor ISP. Thus, the ISP that owns network 102 may wish to restrict communication of certain kinds of peer-to-peer requests from network device 108 only to other peer-to-peer nodes that are within network 102.

Figure 2:
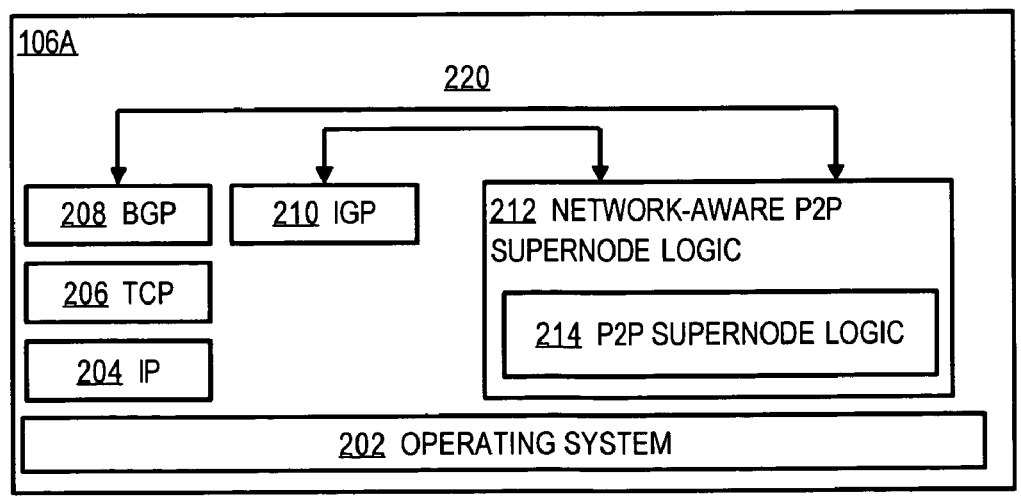
FIG. 2 is a block diagram of an example software architecture for a router that includes a network-aware supernode that implements the approaches herein.

FIG. 2 is a block diagram of an example software architecture for a router that includes a network-aware supernode that implements the approaches herein. A router 106A comprises an operating system that hosts network-oriented applications such as an Internet Protocol (IP) stack 204, Transmission Control Protocol (TCP) module 206, Border Gateway Protocol (BGP) module 208, and Interior Gateway Protocol (IGP) module 210.

IP stack 204 and TCP module 206 implement the IP and TCP protocols for network communications, respectively. BGP module 208 implements Border Gateway Protocol as defined in IETF RFC 1771 and successor RFCs and Internet-drafts. The IGP module 210 may implement any interior gateway protocol that delivers link status information, such as OSPF, IS-IS, etc.

Router 106A also hosts network-aware peer-to-peer supernode logic 212, which includes certain elements of conventional peer-to-peer supernode logic 214. Thus, for example, logic 214 represents software code implementing a supernode in a particular peer-to-peer protocol, and logic 212 represents additional software code implementing the particular functions described herein.

Links 220 couple BGP module 208 and IGP module 212 to network-aware peer-to-peer supernode logic 212. Links 220 represent communication of BGP UPDATE messages and other BGP messages, and IGP link status update messages, to network-aware peer-to-peer supernode logic 212. In an embodiment, network-aware peer-to-peer supernode logic 212 is configured as an active listener to BGP and IGP events and messages. For example, BGP module 208 forms BGP peering sessions with other routers in network 102 and other routers in other networks through conventional operation of BGP. As BGP UPDATE messages arrive at the BGP module 208, or as BGP module 208 sends BGP UPDATE messages, or as BGP module 208 publishes events relating to forwarding information base (FIB) or routing information base (RIB) updates, network-aware peer-to-peer supernode logic 212 receives such messages and updates. In response, network-aware peer-to-peer supernode logic 212 can modify the behavior of peer-to-peer protocol operations in various ways, as described further below. Similarly, network-aware peer-to-peer supernode logic 212 responds to IGP link status update messages and IGP events that are published by IGP module 212.

A network of the type shown in FIG. 1 may include any number of supernodes 112 and any number of peer nodes 109, 110. In one embodiment, supernodes communicate with peer host nodes using a supernode-host protocol, and supernodes communicate with other supernodes using a separate supernode-supernode protocol. Both protocols support searches, replica lookups, content placement and replication, and placement of resources other than peer content replicas.

To use the supernode-host protocol, provider hosts register information about their content and network-attached resources with the supernode. Consumer hosts forward queries or resource requests to a supernode, which forwards the queries through other supernodes to a host that holds the requested content or that can provide the requested resource. The supernode requests that host to store a content replica, provide a certain resource such as CPU, memory, or storage. Alternatively, the supernode may request a host to respond with a list of other hosts that have the requested resource available.

In the supernode-supernode protocol, supernodes route queries between themselves until a supernode responsible for a requested resource is found. Thus, upon receiving a query message from either a host or another supernode, a supernode may either provide an answer or may forward the query to another supernode. One supernode may select another supernode for forwarding the query based on a distributed hash table algorithm, for example. Supernodes also control content replication and placement.

Figure 6:
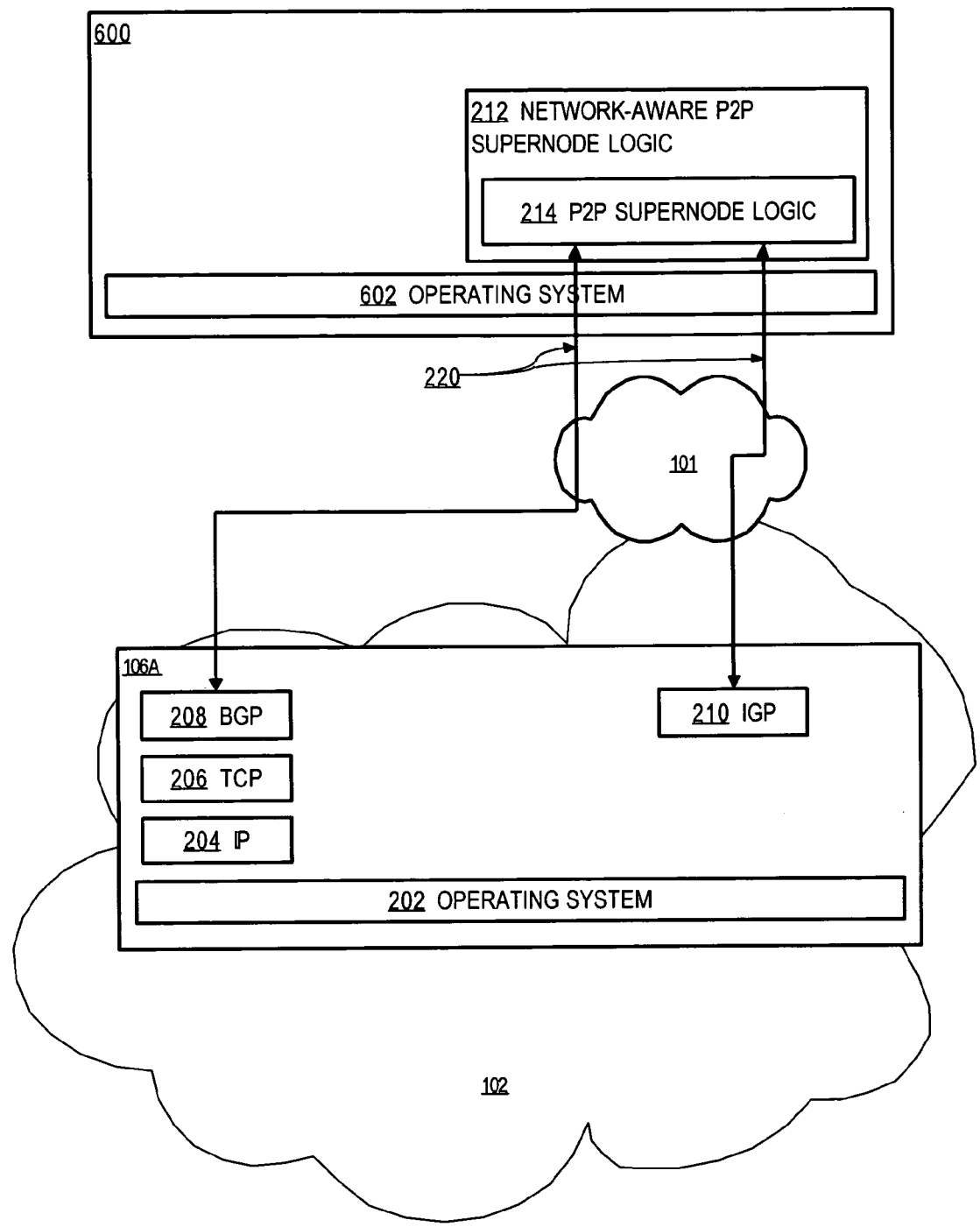
FIG. 6 is a block diagram of an embodiment in which a supernode is hosted in a computer separate from a router.

In various alternative embodiments, supernode 112 is hosted within router 106A, or is hosted in a server, workstation, personal computer or other processor that is separate from but coupled to the router 106A. For example, FIG. 6 is a block diagram of an embodiment in which a supernode is hosted in a computer separate from a router. The router 106A is located within a service provider network 102 and is coupled through Internet 101 to a computer 600. The router 106A hosts an operating system 202, IP stack 204, TCP module 206, BGP module 208, and IGP module 210. Links 212 couple the BGP module 208 and IGP module 210 to peer-to-peer supernode logic 214 and network-aware peer-to-peer supernode logic 212 in computer 600.

2.2 Modifying Operation Based on Network Routing Information

In one embodiment, a supernode or tracker node is an IGP or BGP passive listener; that means, the supernode or tracker node listens to all routing updates from its BGP or IGP routing peers, but never originates any routes itself.

The supernode/tracker can establish peering sessions with other BGP speakers via eBGP or iBGP. If the tracker is not a part of a service provider, but operated by a customer of a service provider, then eBGP may be used. When a supernode/tracker is operated by a service provider's customer, the customer may still want to optimize the service provider's bandwidth use to get a discount on service pricing. If the tracker is operated by a service provider, then either iBGP or eBGP can be used. In the eBGP or iBGP case, the supernode/tracker receives route (prefix) information from other BGP speakers in BGP UPDATE messages. Each route (prefix) has multiple mandatory BGP attributes (AS_PATH, ORIGIN and NEXT_HOP) and one or more optional BGP attributes. The supernode/tracker will use the AS_PATH attribute to decide which peer supernodes to contact, or in case of a tracker, which peer nodes to offer to a requesting node.

Normally a BGP speaker has three routing information bases (RIBs) that store prefix data: Adj-RIB-In, Loc-RIB, and Adj-RIB-Out. The Adj-RIBs-In contains unprocessed routing information that has been advertised to the local BGP speaker by its peers. The Loc-RIB contains the routes that have been selected by the local BGP speaker's Decision Process. The Adj-RIBs-Out contains the routes for advertisement to specific peers by means of the local speaker's UPDATE messages. In an embodiment, the supernode/tracker does not have an Adj-RIB-Out, since it never originates any routes (prefixes). Further, in one implementation, the supernode/tracker may have a single BGP RIB, comprising a combined Adj-RIBs-In and Loc-RIB, which contains all prefixes received from BGP peer speakers. In another implementation, the Adj-RIBs-In and the Loc-RIB are separate, so that policies can be applied to select routes that are installed in the Loc RIB. In such an embodiment, the supernode/tracker operates on the Loc-RIB.

For each peer supernode and for each other node operating under the peer-to-peer protocol, about which the supernode/tracker learns, the supernode/tracker looks up the node's network address and matches the address to a prefix (route) in the BGP RIB. If the prefix's AS_PATH attribute contains a zero length value for the AS_PATH, then the prefix is local to the provider's network. Otherwise, the prefix (route) is in another provider's network. The supernode/tracker then operates with a preference for peer supernodes or tracked nodes that reside in the local provider's network as candidates for potential peer-to-peer connections or content downloads.

In one embodiment, if the supernode/tracker is not a part of provider's network, then the supernode/tracker uses the length value of the AS_PATH attribute and the first AS in the AS_PATH attribute to select the best candidate peer nodes. In an embodiment, supernode/tracker does not limit its choice of candidate p2p peer nodes to only nodes from a local provider's network (or the closest provider's network); some p2p candidate nodes must be selected from outside of the network, but the selection is skewed towards local nodes.

In one implementation, the supernode/tracker only uses the AS_PATH attribute to differentiate peer-to-peer protocol peer nodes in the local provider's network from peer nodes in remote providers' networks. In another implementation, the supernode/tracker uses the AS_PATH length in the AS_PATH attribute to rank candidate peer-to-peer protocol nodes according to their proximity to the local provider's network.

The supernode/tracker can peer up with other link-state IGP speakers to gain knowledge of local provider's IP network topology. This can only happen if the supernode/tracker is a part of the provider's network. The topology knowledge will help the supernode/tracker to select a candidate peer-to-peer protocol supernode that is topologically closest to the supernode, or a "tracked" peer node that is topologically closest to the requesting node.

For each peer supernode or a "tracked" node that the supernode/tracker learns about, and which is local to the provider's network, using the BGP approach that is described above, the supernode/tracker looks up the node's network address and matches the address to a prefix (route) in the IGP RIB. The supernode then uses an SPF algorithm (e.g. Dijkstra's algorithm) to compute the shortest path between itself and a peer supernode.

The supernode/tracker also looks up the requesting node's address and matches the address to an IP prefix in the IGP RIB. This approach assumes that all requesting peer-to-peer protocol nodes are in the provider's network. The active listener tracker then uses an SPF algorithm (e.g. Dijkstra) to compute the shortest path between the requesting peer-to-peer protocol node and the local node that has the desired content. The supernode/tracker then uses the length of the shortest path (i.e., the cost of the path between the two nodes) to rank peer-to-peer protocol candidate nodes.

In one implementation, the supernode/tracker uses the OSPF Metric in Router LSAs, or the IS-IS Metric field in Internal Reachability TLVs to compute the shortest path. In other implementations, the supernode/tracker can use a field from IGP TE extension TLVs, such as the Traffic Engineering metric TLV, the Maximum bandwidth TLV, the Maximum reservable bandwidth TLV, or the Unreserved bandwidth TLV. If the supernode/tracker uses TE extension fields, then the computed path can use the bandwidth TE TLVs to consider the current dynamic loading of the network. That is, the supernode/tracker can select links that are lightly loaded. Alternatively, the supernode/tracker uses the TE or Traffic Engineering metric TLV to steer peer-to-peer protocol traffic away from links with low delay that may be needed for time-critical traffic such as Video on Demand or Voice over IP.

To ensure that the supernode/tracker can determine the complete network topology, the network is assumed to comprise a single IGP area.

The operation of the supernode/tracker is fundamentally different from a router: while a router uses the routing protocol information to determine the next hop for a packet and to switch the packet to that next hop, the supernode/tracker defined herein uses the routing protocol information to determine the set of best candidate peer-to-peer protocol peer nodes to which to connect or from which to download content.

2.2.1 Using IGP Information

In one embodiment, a supernode is configured as an active listener to IGP messages of a router or switch, so that the supernode receives IGP link status messages and modifies an operational characteristic of peer-to-peer traffic or node operations based on the link status messages. For example, a supernode receives link cost, link delay, or link utilization information from an IGP module of a router, and uses such link status information to route traffic to another supernode in the peer-to-peer network.

In one embodiment, a supernode maintains a data structure providing a table of all peer nodes that have previously contacted the supernode, or that are known to be within the autonomous system that contains the supernode. Discovery techniques may be used to locate peer nodes within an AS. Columns in the table indicate link status information for links to the peers, and a preference value that indicates a relative preference for one peer as opposed to another.

The IGP information may be used to select the best possible replica to satisfy a content request of another node. In this context, a "best" possible replica is not necessarily the closest replica; a best replica may be geographically more distant than other replicas but located along network paths that have better performance characteristics, as derived from IGP link status information. Thus, a best possible replica may be a replica that is closest in combination with a producer-consumer path that satisfies attributes specified in a consumer search request.

A supernode also may use the IGP information may be used for the purpose of resource placement or replication. For example, by monitoring search traffic and correlating the search traffic to a network topology and network-attached resources, supernodes can decide when to replicate a content item and can select optimum locations for replicas. Thus, embodiments can find optimal content locations, but without caching or storing content at the supernodes.

A supernode also may use the IGP information to direct searches to under-utilized parts of the network, based on search attributes, or may prune search results from over-utilized parts of the network.

Figure 4A:
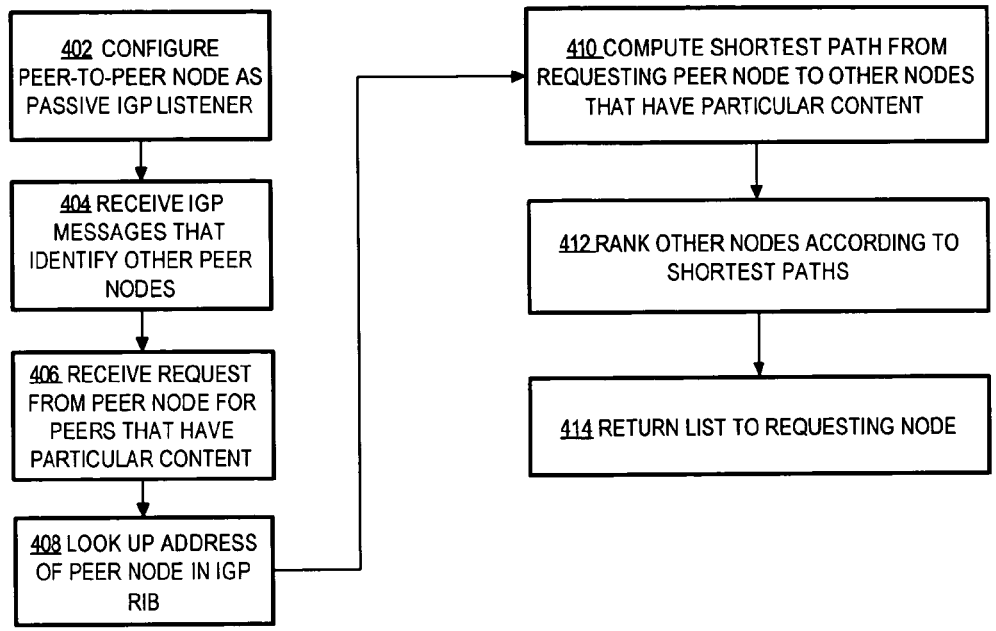
FIG. 4A is a flow diagram of a method of using IGP information in operating a peer-to-peer network node.

FIG. 4A is a flow diagram of a method of using IGP information in operating a peer-to-peer network node according to certain operational steps that are outlined above. In step

402, a peer-to-peer node is configured as a passive IGP listener. For example, supernode 112 is configured as a passive listener to IGP module 210 of router 106A. In step 404, the supernode receives one or more IGP messages that identify other peer nodes. As a result, through IGP network topology information, the supernode 112 learns about other peer nodes that are present in the network.

In step 406, a request is received from a peer node to supply a list of peers that have particular content. For example, node 110 of FIG. 1 requests supernode 112 to provide a list of peers that have a particular streaming movie or digital song. In step 408, the supernode looks up the address of the requesting peer node in the IGP routing information base (RIB). In step 410, the supernode computes a shortest path from the requesting peer node to other known nodes that have the requested content. In step 412, the supernode ranks the other nodes according to path length. In step 414, the supernode returns the ranked list of nodes to the requesting node.

2.2.2 Using BGP Information

In another embodiment, a supernode is an active listener to BGP messages and uses BGP to optimize decisions about which locations of content or resources in a local network are preferred over a remote network. A supernode also may use both BGP and IGP to optimize a path to a router associated with the preferred content location. For example, a supernode receives BGP UPDATE and related messages from a BGP module of a router. The supernode uses information about paths and reachability of other routers and switches to determine where to refer peer requests for resources or replicas. For example, in one approach, a supernode refers peer nodes only to resources or replicas that are located in the same BGP autonomous system (AS) as the associated router or the supernode.

Network simulations of this approach have been found to reduce traffic across different autonomous systems by as much as 50%. When the different autonomous systems are owned and operated by different ISPs, this approach is expected to significantly reduce costs by reducing inter-ISP traffic for which a foreign ISP imposes charges. Further, the approach herein enables a system to deliver content from an optimal location without the cost and infrastructure burdens involved in caching or storing content at a supernode.

Constraining responses to peer nodes only to a particular AS is only one example of how peer-to-peer node behavior may be controlled based on BGP information. For example, in one embodiment, prefix information from BGP may be used to prune results of resource searches to include only peer nodes that are located within a local autonomous system, or only peer nodes that are located within a specified set of autonomous systems.

In one embodiment, a supernode may provide information about network-attached resources to BGP for the purpose of causing BGP to apply modified routing policies. For example, a supernode may provide information that causes BGP to color prefixes that are associated with network-attached resources or content replicas that the supernode and its peer nodes use. Route coloring may be used, for example, to apply access policies to network-attached resources, or to shift traffic from over-utilized paths to under-utilized paths. This approach enables an ISP, for example, to deliver different service classes for different kinds of peer-to-peer traffic, and to charge different costs to its customers for such classes. Thus, with the approaches herein, peer-to-peer traffic becomes a source of revenue for an ISP, rather than an ongoing problem.

Certain descriptions above have specified that supernodes may be configured as active listeners to BGP and IGP and thereby receive BGP and IGP messages. Alternatively, a BGP module of a router and/or an IGP module of a router may be modified to dynamically export, to a supernode, information about network topology, network utilization, and other network characteristics known to the routing protocols.

Further, supernodes also may implement interfaces that enable peer-to-peer hosts to obtain network routing information from supernodes for use at the application level at such hosts. Because some users may implement peer-to-peer hosts using malicious code, a supernode may implement security restrictions that enable a peer-to-peer host to obtain only selected elements of the network routing information that a supernode has obtained from a router. This approach enables peer-to-peer hosts to acquire a safe level of information about internal network topology and performance without exposing an ISP network to security risks.

In one embodiment, supernodes that implement the approaches herein use BitTorrent as a peer-to-peer communication protocol. In this embodiment, a supernode may be configured as a BitTorrent "Tracker" node with additional software instructions that implement the methods described herein.

In embodiments that listen and act upon BGP information, network security may be enforced by modifying a configuration of BGP modules on routers in the network. For example, BGP modules may be configured to refuse to accept routes that a supernode attempts to inject into the router. Thus, a supernode may be configured as an eBGP peer, but the approaches herein do not contemplate configuring nodes as iBGP peers, to ensure network security and to maintain the integrity of routing tables at BGP peers in a protected network.

In still another embodiment, a supernode may communicate information about peer-to-peer traffic to an associated router, and a BGP module or IGP module at the router may use the peer-to-peer traffic information to modify operation of BGP or IGP at the router. For example, a router may initiate routing updates, including BGP updates and IGP updates relating to route costs or metrics based on observed or expected peer-to-peer traffic as detected by a supernode. Further, a router may initiate MPLS traffic engineering updates or other traffic engineering steps based on observed or expected peer-to-peer traffic. A router may also establish a peering session with a supernode and control peering sessions among supernodes based on received peer-to-peer traffic and routing information at the router.

Figure 4B:
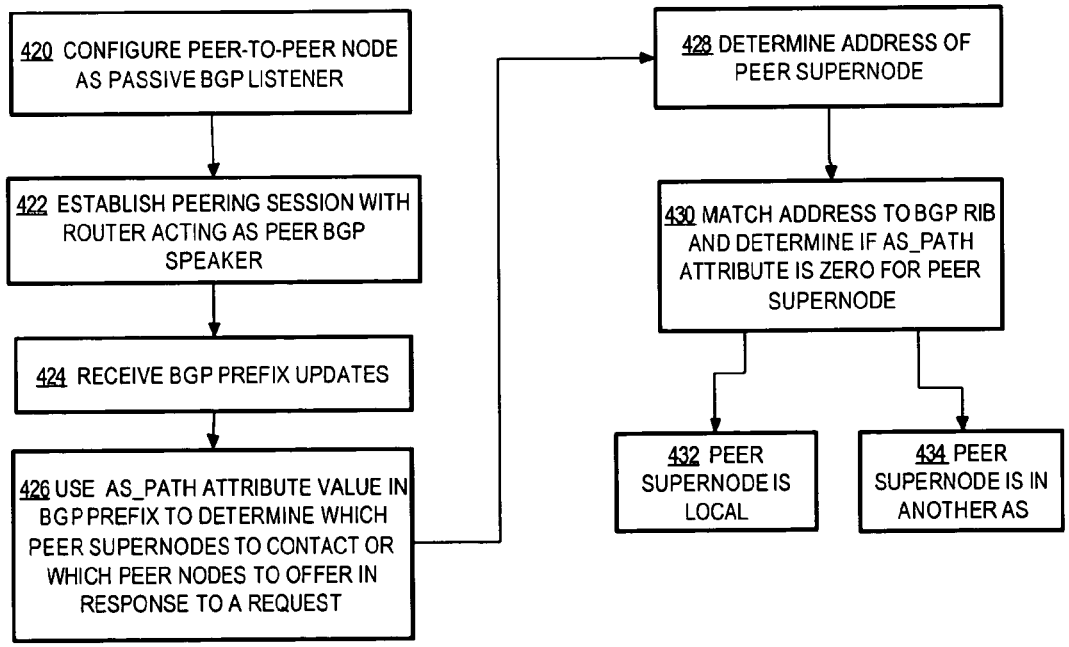
FIG. 4B is a flow diagram of a method of using BGP information in operating a peer-to-peer network node.

FIG. 4B is a flow diagram of a method of using BGP information in operating a peer-to-peer network node. In step 420, a peer-to-peer node is configured as a passive BGP listener. For example, supernode 112 is configured as a passive listener to BGP module 208 of router 106A. In step 422, the supernode establishes a peering session with a router acting as a peer BGP speaker. Thus, supernode 112 establishes a BGP peering session with BGP module 208, and receives one or more BGP prefix updates from the BGP module, as indicated in step 424.

In step 426, the supernode uses the AS_PATH attribute of one or more BGP prefixes to determine which peer supernodes to contact, or which peer nodes to offer in response to a request. For example, in step 428, the address of a peer supernode is determined. In step 430, the address is matched to the BGP RIB and a determination is made whether the AS_PATH attribute is zero for the peer supernode. If so, then the peer supernode is within the same autonomous system and is considered local, as shown in step 432. If the AS_PATH value is nonzero, then the peer supernode is in another AS. Based on this determination, the supernode may elect to request only local supernodes whether the local supernodes have particular content that a peer node is seeking.

2.3 Example Network-Aware Node Configurations

2.3.1 Network-Aware Bittorrent Tracker

In an embodiment, supernode 112A and supernode logic 214 implement a BitTorrent tracker node. The BitTorrent protocol is described in a document that is online at the time of this writing in the file "protocol.html" of the domain "bittorrent.com" on the World Wide Web. In operation, the standard BitTorrent protocol has the following characteristics. The tracker receives requests for lists of peers that contain the content of interest, and sends the requesting nodes lists of random peers; such lists may be sent using HTTP or HTTPS. Requesting nodes start downloading the content from those peers. Requesting nodes periodically contact the tracker to update the tracker about download progress and about the pieces of content that they already have and can serve to other nodes. Requesting nodes upload to other nodes or download from other nodes using direct peer-to-peer connections. The direct connections among requesting nodes and nodes with data for downloading use the BitTorrent peer protocol, which operates over TCP. The node that first holds the complete requested data is involved in uploading but not downloading, since that node has the entire requested file.

FIG. 3 is a flow diagram of a method of operating a network-aware supernode. For the method of FIG. 3, supernode 112 of FIG. 1 is configured as a BitTorrent tracker node. Thus, peer-to-peer supernode logic 214 of FIG. 2 conforms to the operational characteristics of BitTorrent tracker nodes, and network-aware peer-to-peer supernode logic 212 of FIG. 2 implements certain functional aspects of FIG. 3.

In step 302, a peer node attempts to contact a tracker node and requests a list of other peers from which to download data. For example, peer node 110 of FIG. 1 attempts to contact supernode 112 using a BitTorrent data request for other peers that hold particular content.

However, the network-aware peer-to-peer supernode logic 212 of the supernode 112 intercepts the peer request and prevents the request from reaching the conventional peer-to-peer supernode logic 214. Such interception may occur through deep packet inspection, or by WCCP redirection of traffic to tracker ports. For example, many implementations of BitTorrent use port 6969 as the default protocol port, and port 6969 could be redirected to the logic 212.

In step 306, a list modification program is invoked automatically at the tracker node, and the peer request is forwarded to the conventional peer-to-peer supernode logic 214. Thus, the modified tracker node essentially is alerted that a peer request has arrived, wakes up list modification logic, and forwards the request for normal processing.

In step 308, the tracker node creates a list of peers and forms a response message. For example, peer-to-peer supernode logic 214 forms a list of random peers by operating according to conventional BitTorrent practice, and attempts to send a response message back to the peer node 110. In step 310, however, the list modification logic intercepts the response message. The list modification logic extracts the random list of peers, examines the list of peers, and modifies the list of peers. Modifying the list of peers may include deleting all peers that are outside an autonomous system that includes the tracker node, limiting the number of peers that are located outside an autonomous system that includes the tracker node, or adding in peers that are within the same AS.

For example, the list modification logic may comprise network-aware peer-to-peer supernode logic 212 of FIG. 2, and such logic may delete from the random list any peers that are not within network 102. BGP reachability information may be used to determine whether a particular peer is within network 102 based on comparing an IP address of a peer in the random list to a BGP routing information base maintained by BGP module 208. Examples of using BGP information to act on peer requests are described further herein.

In an alternative embodiment, the list modification logic may allow a specified number of peers in the random list that are outside the AS that contains the tracker node, and delete all other peers from the random list. For example, the list modification logic may effectively limit, to a small constant k, the number of peers in the returned list that are outside the AS that contains the tracker node. Various embodiments could use k=2, k=6, or any other value for k that is appropriate for business goals of an ISP, efficient response to a peer request, etc.

In step 312, the list modification logic replies to the peer node and provides the modified list of peers, acting as proxy for peer-to-peer supernode logic 214 and providing only the modified list of peers. Thereafter, the peer node continues with normal peer-to-peer data transfer operations based on the modified list of peers.

Thus, by intercepting queries from clients to the tracker node, inspecting queries, intercepting and modifying responses, the list modification logic can make appropriate modifications to the returned peer list. However, the list modification logic is not involved in actual data upload or download among peer nodes. The supernode 112 acts as a per-AS tracker and responds only to peers that are within the AS. Improving AS locality is performed at the peer selection step, which is as early as possible in the peer-to-peer process. The approach is simple and transparent to BitTorrent peer nodes and other tracker nodes.

In this approach, a reduction of inter-autonomous system traffic can be achieved without affecting peer download time. Thus, use of this approach does not facilitate the use of peer-to-peer networks in any particular way, and should not result in user complaints that application experiences are degraded.

In one embodiment, network-aware peer-to-peer supernode logic 212 and peer-to-peer supernode logic 214 are integrated, such that network-aware optimal selection is made in a single pass of the algorithm. Such an embodiment is particularly appropriate when the supernode and content location algorithm are under control of a Distributed Service Provider.

2.3.2 Network-Aware Gnutella Ultrapeer

In one embodiment, a supernode is implemented as a network-aware Gnutella ultrapeer, and is owned or operated by a network service provider, such as an ISP. In this embodiment, Gnutella peer-to-peer search results can be influenced by the underlying network topology and service provider preferences. For example, a network-aware ultrapeer can direct peer-to-peer traffic to stay within a provider's own network, so that the peer-to-peer traffic becomes "on-network" traffic. The network-aware ultrapeer uses information from BGP to determine whether a particular content provider or another ultrapeer is within the provider's network.

In one approach, Gnutella flood searches are pruned so that each search stays within the limits of a provider's network, by forwarding the incoming Query message only to on-network ultrapeers. A decision about whether to forward traffic only to on-network ultrapeers, or to off-network ultrapeers, is made based on the BGP AS_PATH attribute, thereby limiting the scope of the search to a provider's network.

In another approach, incoming search results are pruned to prefer on-network content locations. For example, all incoming QueryHits messages for a given query are collected and ordered based on whether the corresponding host is on-network or off-network. The BGP AS_PATH attribute value drives the decision.

To collect all incoming QueryHits messages, the ultrapeer waits for a reasonable timeout period for QueryHits messages to arrive. All incoming QueryHits messages are cached in the ultrapeer. Each ultrapeer already keeps state data for each Query message so that the ultrapeer can correlate an incoming QueryHits message with a previously sent Query message. QueryHits messages that arrive after the timeout expiration are dropped. In one example of a policy decision, all QueryHits messages are dropped if the IP address of the Responding Host in the Descriptor Payload indicates an off-net responding host.

In an example refinement of the preceding policy, off-network responding hosts are considered, but on-network responding hosts are preferred over off-network responding hosts. If there is at least one on-network responding host for the query, all off-network QueryHits messages will be dropped. Also, if the content is only available from an off-network location, the ultrapeer can choose the closest location based on the BGP AS_PATH attribute.

In another embodiment, rather than dropping the off-network QueryHits messages, the Gnutella protocol is adapted to contain a preference for a particular server. For example, each QueryHits message contains a preference field that identifies a particular preferred server. The value of the preference field is modified based on the routing information received from BGP or IGP.

In another embodiment, for content located in on-network responding hosts, a network-aware ultrapeer may consider the network topology or aspects of network utilization when selecting a preferred responding host. Network topology and network utilization information for use in such selections may comprise IGP traffic engineering information.

In any of the foregoing embodiments, a service provider such as an ISP owns and operates ultrapeers in association with routers or switches. User nodes are either Gnutella leaf nodes or ordinary ultrapeers. Only network-aware ultrapeers as described herein are allowed o connect to other ultrapeers in other providers' networks. This approach ensures that all queries that could potentially go off-network will pass through the network-aware ultrapeer. An approach in which user node only connect to ultrapeers within the provider's network can be achieved by filtering connect requests and only allowing connections with a provider's ultrapeers.

2.4 Other Operational Modifications

Supernodes that implement the approaches herein may combine network information obtained from BGP or IGP with application-specific knowledge that the supernodes already possess. For example, supernodes that run applications may have information about the type of information that the applications exchange, requirements of applications for delay, jitter, or other quality of service (QoS) attributes, the location of primary hosts and alternate hosts that serve requested content, etc. Supernodes may combine such information with BGP path and reachability information, and IGP link status information, to determine where to route requests of peers or how to respond to requests of peers.

Embodiments may use network routing information, alone or in combination with application-specific information, to modify any of several operational parameters or behaviors of a peer-to-peer network. For example, in one embodiment, responses to content searches are modified. Based on a set of attributes, a supernode may locate content providers and search for desired content and deliver the content to consumer peer nodes as efficiently as possible. Examples of content include any digitized content such as text, images, video, audio, multimedia, etc. As another example, a supernode may modify its content distribution behavior, including replication or distribution of content on a one-to-many basis, using the network routing information and application-specific information.

In another example, a supernode may use network routing information to determine content placement or content replication for the purpose of efficient content distribution and content search. Thus, for example, a supernode may determine that a replica of particular content is best placed at a particular peer node, based on link characteristics or autonomous system topology.

In yet another example, a supernode may perform search, allocation, or placement for resources other than peer-to-peer resources, e.g., any resource type attached to a network that can be utilized by distributed applications. Examples of network-attached resources are CPU cycles, storage, and memory. Examples of distributed computing applications using network-attached resources are peer-to-peer applications, grid computing applications, and personalized Web searches.

Embodiments may be used with any peer-to-peer search protocol, such as flood searching in Gnutella, searches based on distributed hash tables using Chord, Tapestry, PeerSearch, etc. Service providers are unlikely to reveal internal network topology information, or information exchanged among BGP modules or IGP modules of service provider routers and switches; in such embodiments, all supernodes that interact to provide the approaches herein operate under control of a particular service provider.

2.5 Distributed Service Providers and Applications

In an embodiment, an ISP may configure and deploy supernodes that implement the approaches herein for the purpose of delivering peer-to-peer applications and services to ISP users, thereby creating new revenue streams from peer-to-peer traffic rather than attempting to restrict it. Thus, peer-to-peer nodes as described herein may deliver content, applications or services for ISPs in a selective manner that optimizes use of ISP resources and uses ISP network topology and routing protocol information in a new way.

Using the approaches herein, peer-to-peer network traffic can be shaped based on information about network topology, providing better network utilization. Further, the approaches herein may result in faster downloads of content by locating a server that is reachable through a better connection. The approaches herein also allow for sharing of other resources, such as CPUs, memory, etc., providing better network utilization and faster content delivery.

Peer-to-peer traffic also may be contained within an AS, so that an ISP can regulate the volume of peering traffic that leaves an AS owned or operated by the ISP. ISPs are able to reduce network costs by serving content locally or from under-utilized parts of the network. Further, by coupling router QoS processing and peer-to-peer protocols using the approaches herein, ISPs are able to derive additional revenues by charging a premium for transmitting peer-to-peer traffic, and dropping undesirable peer-to-peer traffic.

Using the approaches herein, an ISP can implement new kinds of services and applications in supernodes 112 within an ISP network. The approaches herein offer ISPs the opportunity to migrate to a business model in which both data sources and control plane equipment is fully distributed across the ISP network, rather than constraining ISP services to centralized control plane equipment or centralized data sources.

In this approach, central office-type switching equipment is replaced with distributed service nodes that use peer-to-peer protocols, under the control of network-aware supernodes to ensure that inter-AS traffic is limited. The fully-distributed service model contemplated by the present approaches is expected to have low cost and achieve high scalability by using large numbers of simple, inexpensive hardware platforms to host network-aware supernode logic. Such a service model also can achieve high availability through massive redundancy in the use of large numbers of such platforms.

In one embodiment, router 106A of FIG. 2 may be implemented as a customer premises equipment (CPE) device that is customer-installed and self-configuring. In this embodiment, router 106A acts as a distributed service appliance that can store content, applications and services for delivery to the customer or to friends or peers of the customer. Router 106A implemented as a CPE device may comprise, for example, a Linux PC appliance with hard disk storage, a software firewall, network interfaces, etc. The CPE device may be customer-owned or leased, enabling an ISP a method to grow with minimal centralized expenses, as the distributed services are primarily hosted on the CPE devices in communication using peer-to-peer protocols.

In any of the embodiments of this section, ISP applications and services may include: peer-to-peer sharing and storage of video; storage of any digitized content in a pooled fashion across multiple peer-to-peer nodes, so that a network of CPE devices configured as provided herein can operate as a consumer storage area network; recorded voice or recorded music; live voice or live telephony; peer-to-peer sharing of pictures, such that storage of pictures is performed not using CDs or similar media but using the CPE device; blogs; neighborhood newspapers; multi-player distributed games; virtual life applications; email; community services; Yellow Pages services; price comparison services; bulletin board services; small business data sharing, comparison shopping, auction and bidding services; distributed data caching and management; advertising; and support for network-enabled consumer electronics such as digital cameras with image backup to the CPE device.

The approaches herein also support the deployment of core routers and edge routers that are enabled with peer-to-peer services. Thus, any and all of the services and applications described above may be hosted in a router configured as shown in FIG. 2 and hosting network-aware peer-to-peer supernode logic 212. Applications may include video splitting and routing, removing undesirable packets such as those relating to peer-to-peer traffic, spam, security attacks, viruses, etc.

The approaches herein also facilitate fundamental changes in methods of interfacing to the Internet. For example, using the approaches herein, information exchange may occur with another person based upon a personal identifier associated with a peer-to-peer node client program that a remote person is using, rather than based upon sending packets to a destination identified by an EP address. A first person may send any form of digitized content to a second person from any location. Services to locate persons, and to locate and exchange content, may be supported in an ISP network. The approaches are highly scalable, taking advantage of the distributed nature of peer-to-peer networks, and enable service providers to launch new services far faster than using a traditional, centralized client-server model.

3.0 Implementation Mechanisms—Hardware Overview

Figure 5:
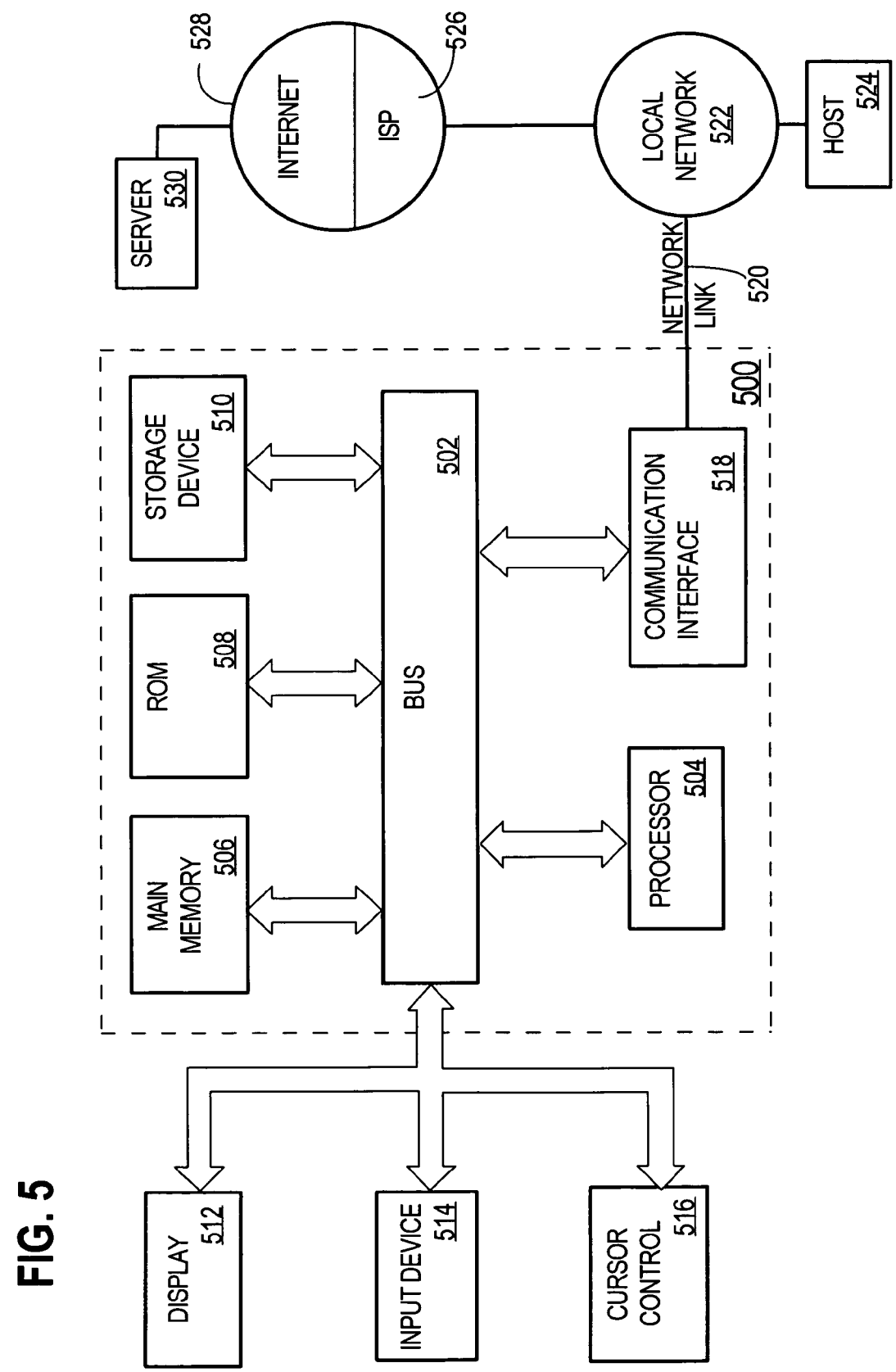
FIG. 5 is a block diagram that illustrates a computer system upon which an embodiment

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for modifying operation of peer-to-peer networks based on integrating network routing information. According to one embodiment of the invention, modifying operation of peer-to-peer networks based on integrating network routing information is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for modifying operation of peer-to-peer networks based on integrating network routing information as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   establishing a first node in a peer-to-peer data communications network, wherein the first node is configured as a supernode in conformance with a peer-to-peer communications protocol, wherein the first node is configured as an active listener to one or more network routing protocols executing at a network router;
   wherein the peer-to-peer communications protocol returns a list of peer nodes that have a replica of a requested resource;
   wherein the one or more network routing protocols comprise BGP;
   receiving a routing information message from one of the one or more network routing protocols;
   wherein the routing information message comprises a BGP UPDATE message that contains network routing information;
   modifying an operational characteristic of the first node in response to the routing information message by establishing a preference for local nodes as candidates for responding to one or more requests for one or more resources by storing an AS_PATH attribute in association with a corresponding network prefix for each route in the network routing information;
   after receiving the routing information message, receiving a request of the one or more requests from a second node in the peer-to-peer data communications network for a particular resource of the one or more resources that is known to the first node; and
   the first node determining, based on the modified operational characteristic, a set of best candidate peer-to-peer protocol nodes known to the first node to have a replica of the particular resource requested by the second node;
   wherein each node of the set of best candidate peer-to-peer protocol nodes matches a network prefix stored in association with an AS_PATH attribute, wherein the AS_PATH attribute is zero, indicating that the set of best candidate peer-to-peer protocol nodes are located only within a BGP autonomous system that includes the network router;
   responding to the request by returning to the second node a list of one or more peer-to-peer protocol nodes of the set of best candidate peer-to-peer protocol nodes,
   wherein the operational characteristic comprises referring the second node to a replica of the resource that is located only within a BGP autonomous system that includes the router.

2. A method as recited in claim 1, wherein the peer-to-peer communications protocol is BitTorrent.

3. A method as recited in claim 1, wherein the peer-to-peer communications protocol is any one selected from the group consisting of Kazaa, Gnutella, Fast Track, eDonkey, Chord, and Tapestry.

4. A method as recited in claim 1, wherein the one or more network routing protocols comprise an interior gateway protocol with traffic engineering extensions.

5. A method as recited in claim 1, wherein the routing information message comprises an IGP link status update message of an interior gateway protocol with traffic engineering extensions, and wherein the operational characteristic comprises referring the second node to a replica of the resource that is located only on a link that is referenced in the link status update message and that is preferred with respect to the router based on the link status.

6. A method as recited in claim 5, wherein the IGP link status update message specifies any parameter selected from the group consisting of link cost, link delay, and link utilization.

7. A method as recited in claim 5, wherein the operational characteristic comprises routing traffic from the first node to the second node on a path that is determined at least in part based on the link status update message.

8. An apparatus, comprising:
  means for establishing a first node in a peer-to-peer data communications network, wherein the node is configured as a supernode in conformance with a peer-to-peer communications protocol, wherein the first node is configured as an active listener to one or more network routing protocols executing at a network router;
    wherein the peer-to-peer communications protocol returns a list of peer nodes that have a replica of a requested resource;
    wherein the one or more network routing protocols comprise BGP;
  means for receiving a routing information message from one or more network routing protocols;
  wherein the routing information message comprises a BGP UPDATE message that contains network routing information;
  means for modifying an operational characteristic of the first node in response to the routing information message by establishing a preference for local nodes as candidates for responding to one or more requests for one or more resources by storing an AS_PATH attribute in association with a corresponding network prefix for each route in the network routing information;
  means for receiving a request of the one or more requests from a second node in the peer-to-peer data communications network for a particular resource of the one or more resources that is known to the first node; and
  means for the first node determining, based on the modified operational characteristic, a set of best candidate peer-to-peer protocol nodes known to the first node to have a replica of the particular resource requested by the second node;
  wherein each node of the set of best candidate peer-to-peer protocol nodes matches a network prefix stored in association with an AS_PATH attribute, wherein the AS_PATH attribute is zero, indicating that the set of best candidate peer-to-peer protocol nodes are located only within a BGP autonomous system that includes the network router; and
  means for responding to the request by returning to the second node a list of one or more peer-to-peer protocol nodes of the set of best candidate peer-to-peer protocol nodes,
  wherein the set of best candidate peer-to-peer protocol nodes are located only within a
    BGP autonomous system that includes the router;
    and wherein the operational characteristic comprises referring the second node to a replica of the resource that is located only within a BGP autonomous system that includes the router.

9. An apparatus as recited in claim 8, wherein the peer-to-peer communications protocol is BitTorrent.

10. An apparatus as recited in claim 8, wherein the peer-to-peer communications protocol is any one selected from the group consisting of Kazaa, Gnutella, Fast Track, eDonkey, Chord, and Tapestry.

11. An apparatus as recited in claim 8, wherein the one or more network routing protocols comprise an interior gateway protocol with traffic engineering extensions.

12. An apparatus as recited in claim 8, wherein the routing information message comprises an IGP link status update message of an interior gateway protocol with traffic engineering extensions, and wherein the operational characteristic comprises referring the second node to a replica of the resource that is located only on a link that is referenced in the link status update message and that is preferred with respect to the router based on the link status.

13. An apparatus as recited in claim 12, wherein the IGP link status update message specifies any parameter selected from the group consisting of link cost, link delay, and link utilization.

14. An apparatus as recited in claim 12, wherein the operational characteristic comprises routing traffic from the first node to the second node on a path that is determined at least in part based on the link status update message.

15. A peer-to-peer network, comprising:
  one or more routers, wherein each of the routers comprises a Border Gateway Protocol (BGP) module and an Interior Gateway Protocol (IGP) module;
  one or more peer-to-peer nodes, wherein at least one of the peer-to-peer nodes is communicatively coupled to at least one of the routers, wherein the peer-to-peer nodes communicate among one another according to a peer-to-peer data communication protocol; wherein the peer-to-peer communication protocol returns a list of peer nodes that have a replica of a requested resource;
  a supernode that is communicatively coupled to one of the routers and that is configured as a supernode in conformance with the peer-to-peer communications protocol, wherein the supernode is configured as an active listener to the BGP module and the IGP module, wherein the supernode comprises one or more sequences of computer program instructions which, when executed by one or more processors, cause the one or more processors to perform the steps of:
    receiving a routing information message from one or more of the BGP module and the IGP module;
    wherein the routing information message contains network routing information;
    modifying an operational characteristic of the supernode in response to the routing information message by establishing a preference for local nodes as candidates for responding to one or more requests for one or more resources by storing an AS_PATH attribute in association with a corresponding network prefix for each route in the network routing information;
    after receiving the routing information message, receiving a request of the one or more requests from a second node in the peer-to-peer data communications network for a particular resource of the one or more resources that is known to the supernode node; and
    the supernode determining, based on the modified operational characteristic, a set of best candidate peer-to-peer protocol nodes known to the supernode to have a replica of the resource requested by the second node;
    responding to the request by returning to the second node a list of one or more peer-to-peer protocol nodes of the set of best candidate peer-to-peer protocol nodes, wherein each node of the set of best candidate peer-to-peer protocol nodes matches a network prefix stored in association with an AS_PATH attribute, wherein the AS_PATH attribute is zero, indicating that the set of best candidate peer-to-peer protocol nodes are located only within a BGP autonomous system that includes the router;

wherein the operational characteristic comprises referring the peer-to-peer node to a replica of the resource that is located only within a BGP autonomous system that includes the router from which the routing information message was received.

16. A network as recited in claim 15, wherein the peer-to-peer communications protocol is BitTorrent.

17. A network as recited in claim 15, wherein the peer-to-peer communications protocol is any one selected from the group consisting of Kazaa, Gnutella, Fast Track, eDonkey, Chord, and Tapestry.

18. A network as recited in claim 15, wherein the routing information message comprises an IGP link status update message of an interior gateway protocol with traffic engineering extensions, and wherein the operational characteristic comprises referring the one of the peer-to-peer nodes to a replica of the resource that is located only on a link that is referenced in the link status update message and that is preferred with respect to the router from which the routing information message was received, based on the link status.

19. A network as recited in claim 18, wherein the IGP link status update message specifies any parameter selected from the group consisting of link cost, link delay, and link utilization.

20. A network as recited in claim 18, wherein the operational characteristic comprises routing traffic from the supernode to the peer-to-peer node on a path that is determined at least in part based on the link status update message.

21. A network as recited in claim 15, wherein the supernode is configured as a BitTorrent tracker node.

22. A network as recited in claim 15, wherein the supernode is configured as a Gnutella ultrapeer node.

23. A computer-readable volatile or non-volatile storage medium storing one or more sequences of instructions, which instructions, when executed by one or more processors, cause the one or more processors to carry out the steps of:

establishing a first node in a peer-to-peer data communications network, wherein the first node is configured as a supernode in conformance with a peer-to-peer communications protocol, wherein the first node is configured as an active listener to one or more network routing protocols executing at a network router;

wherein the peer-to-peer communications protocol returns a list of peer nodes that have a replica of a requested resource;

wherein the one or more network routing protocols comprise BGP;

receiving a routing information message from one of the one or more network routing protocols;

wherein the routing information message comprises a BGP UPDATE message that contains network routing information;

modifying an operational characteristic of the first node in response to the routing information message by establishing a preference for local nodes as candidates for responding to one or more requests for one or more resources by storing an AS_PATH attribute in association with a corresponding network prefix for each route in the network routing information;

after receiving the routing information message, receiving a request of the one or more requests from a second node in the peer-to-peer data communications network for a particular resource of the one or more resources that is known to the first node; and the first node determining, based on the modified operational characteristic, a set of best candidate peer-to-peer protocol nodes known to the first node to have a replica of the particular resource requested by the second node;

wherein each node of the set of best candidate peer-to-peer protocol nodes matches a network prefix stored in association with an AS_PATH attribute, wherein the AS_PATH attribute is zero, indicating that the set of best candidate peer-to-peer protocol nodes are located only within a BGP autonomous system that includes the network router;

responding to the request by returning to the second node a list of one or more peer-to-peer protocol nodes of the set of best candidate peer-to-peer protocol nodes, wherein the operational characteristic comprises referring the second node to a replica of the resource that is located only within a BGP autonomous system that includes the router.

24. The computer-readable volatile or non-volatile storage medium as in claim 23, wherein the peer-to-peer communications protocol is any one selected from the group consisting of Kazaa, Gnutella, Fast Track, eDonkey, Chord, Tapestry, and BitTorrent.

25. The computer-readable volatile or non-volatile storage medium as in claim 23, wherein the one or more network routing protocols comprise an interior gateway protocol with traffic engineering extensions.

26. The computer-readable volatile or non-volatile storage medium as in claim 23, wherein the routing information message comprises an IGP link status update message of an interior gateway protocol with traffic engineering extensions, and wherein the operational characteristic comprises referring the second node to a replica of the resource that is located only on a link that is referenced in the link status update message and that is preferred with respect to the router based on the link status.

27. A computer-readable volatile or non-volatile storage medium as in claim 26, wherein the IGP link status update message specifies any parameter selected from the group consisting of link cost, link delay, and link utilization.

28. A computer-readable volatile or non-volatile storage medium as in claim 26, wherein the operational characteristic comprises routing traffic from the first node to the second node on a path that is determined at least in part based on the link status update message.

* * * * *